Sept. 17, 1968   M. HORWITZ   3,401,707
PORTABLE VEHICLE WASHING DEVICE
Filed Nov. 28, 1966   2 Sheets-Sheet 1

INVENTOR
MANDEL HORWITZ
BY
Eli Mullin
ATTORNEY

Sept. 17, 1968  M. HORWITZ  3,401,707
PORTABLE VEHICLE WASHING DEVICE
Filed Nov. 28, 1966  2 Sheets-Sheet 2

INVENTOR
MANDEL HORWITZ
BY
Eli Mullin
ATTORNEY

United States Patent Office 3,401,707
Patented Sept. 17, 1968

3,401,707
PORTABLE VEHICLE WASHING DEVICE
Mandel Horwitz, 270 Euclid Ave.,
Winnetka, Ill. 60093
Filed Nov. 28, 1966, Ser. No. 597,366
12 Claims. (Cl. 134—100)

ABSTRACT OF THE DISCLOSURE

A vehicle washing device removably self-mounted in spaced relationship with the roof of an automobile or the like and comprising various hose members interconnected together. The device sprays the entire surface of the automobile with water supplied from a conventional garden hose. Means are provided to automatically mix detergent or wax with water. The various hose members may be disassembled or folded into a compact package for transporting or storage.

Background of the invention

This invention relates generally to a portable washing device and more particularly relates to a portable vehicle washing device for home use including means for automatically dispensing detergent, wax or the like with the water for washing the vehicle.

Prior to the invention herein, the car washing devices most commonly used were generally permanently mounted on the floor or supported from a garage ceiling or upper structure to extend down therefrom over the car. The installation space and complex mounting arrangements which were required, precluded universal acceptance of these devices for home or occasional use. In an attempt to overcome these problems, portable washing devices supportable on the car were previously tried, but these also had several undesirable features. For example, the same washing device was not adaptable for use on all the various sizes and types of cars. Hence, for people who had several cars, more than one of these devices would normally be required. Furthermore, these devices sprayed only the top surface of the car. Thus it was still necessary to manually apply water to substantial areas on the sides thereof. Still another objection was that the construction and shape of the prior devices made storage and transportation thereof quite difficult.

Summary of the invention

The portable vehicle washing device of this invention overcomes the aforedescribed problems by providing support means capable of supporting the device in operable position on substantially all sizes and types of cars. Moreover, the device herein includes a top hose section to spray the top surface of the car and a pair of oppositely positioned side hose sections extending down the sides of the car for spraying the same with detergent and/or water. Thus, substantially the entire outer surface of the car is simultaneously and automatically sprayed.

It is therefore a primary object of the invention to provide a portable vehicle washing device which is universally adaptable for use on any type car.

Another primary object is to afford a portable vehicle washing device which may be disassembled or folded into a compact package for convenience of storage or ease in transporting from one location to another.

Another object is to provide a portable vehicle washing device which will automatically mix detergent or wax with water.

Another object is to afford a portable vehicle washing device which comprises a plurality of replaceable detachable hose members of varying lengths whereby the area of water distribution may be varied.

Still another object is to provide a portable vehicle washing device having perforated hose members that are supported in spaced relationship with the surface of the automobile thereby maximizing the area covered by the streams of water discharging from the perforations of the hose members.

Yet another object is to provide adjustable support means for the device to optimize the support of the device on any type car being washed.

Yet a further object is to afford means cooperating with the roof gutters of "hard-top" cars for removably mounting and supporting the device in operational position.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

Brief description of the drawings

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings.

*Discription of the preferred embodiment*

Figure 1:
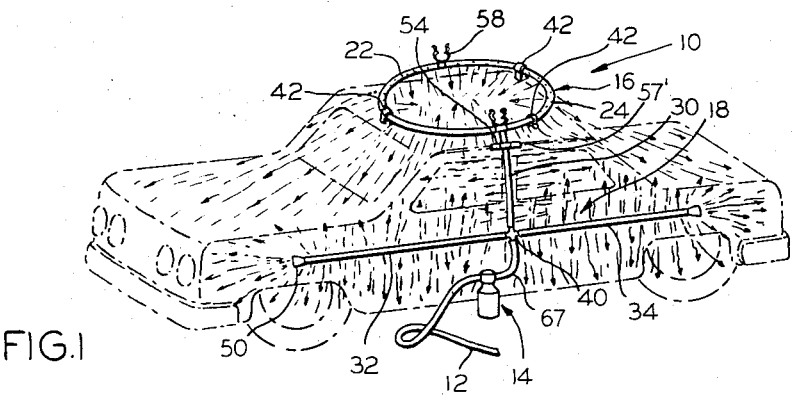
FIG. 1 is a perspective view of the portable vehicle washing device embodying the principles of the invention illustrated in operative position on an automobile shown in phantom outline.
Figure 2:
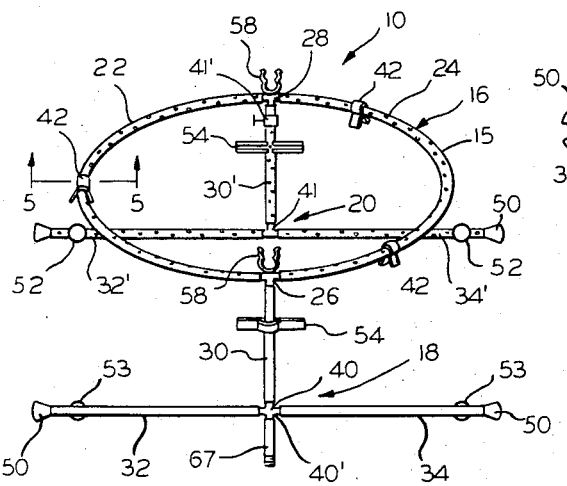
FIG. 2 is a perspective view of the portable vehicle washing device in its assembled operative position.
Figure 3:
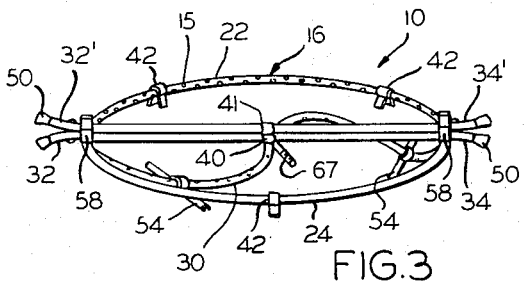
FIG. 3 is a perspective view of the portable vehicle washing device folded into its storage or transporting condition.

Referring now to FIGURES 1, 2 and 3 of the drawings, reference numeral 10 indicates generally a water spraying hose assemblage adapted for use with an ordinary garden hose 12 (FIG. 1). A liquid control means (see FIGS. 1 and 9 to 13) indicated generally by reference numeral 14 may be interposed between the water spraying hose assemblage 10 and the garden hose 12 to mix detergent, wax or the like with the water sprayed on the car. The hose assemblage 10 is self-supporting when positioned on the car as shown in FIG. 1, and easily disassembled or folded into a compact package as shown in FIG. 3.

Hose assemblage 10 includes perforations 15 angularly spaced throughout thus insuring water coverage of a large area. Apertures 15 are also formed of various sizes and shapes to vary the spray or stream intensity and the angular direction of the same.

Figure 4:
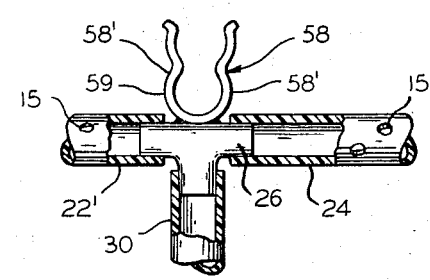
FIG. 4 is a fragmentary sectional view of the various parts associated with one of the T connectors which couples the top hose section with one of the side hose sections.

Referring particularly to FIGS. 1, 2 and 4, the hose assemblage 10 comprises a circular top hose section indicated generally by the reference numeral 16 and a pair of opposed inverted T shaped side hose sections respectively indicated generally by the reference numerals 18 and 20. The top hose section 16 may be formed from two semi-circularly shaped perforated hose members 22, 24, coupled together by a pair of three terminal T type male connectors 26, 28. As shown in FIG. 4, adjacent ends of hose members 22, 24, are press-fitted over opposite terminal ends of connectors 26, 28.

As will be seen from viewing FIG. 2, side hose sections 18, 20 comprise respectively intermediate vertical perforated hose members 30, 30', perforated horizontal front hose members 32, 32', and perforated horizontal rear hose members 34, 34'. The upper ends of the intermediate sections 30, 30' are attached respectively to connectors 26, 28.

Intermediate hose member 30, front hose member 32 and rear hose member 34 are coupled together by a four terminal male connector 40. The lower end of the hose member 30 and the inner ends of the front and rear hose members 32, 34 are press-fitted over three of the four terminals of connector 40. The liquid input, which may be clear water or water mixed with detergent or wax, is connected into the hose assemblage 10 through the remaining available terminal 40' of connector 40 (see FIG. 2).

Intermediate hose member 30', and the front and rear hose members 32', 34' of side hose section 20 are coupled together by the three terminal male connector 41. The lower end of hose member 30' and the inner ends of the front and rear hose members 32', 34' are press-fitted over the terminals of connector 41. An on-off valve 41' may be positioned in the intermediate hose 30' to control liquid flow through side hose section 20. Similarly other control valves may be inserted in other parts of assemblage 10. In operation, the horizontal front hose members 32, 32' extend toward the front of the side of the car whereas the rear hose members 34, 34' extend toward the rear of the side of the car.

A plurality of support members 42 support the water spraying hose assemblage 10 on the roof of the car. Support members 42 are spaced apart and secured on the top hose section 16. Note, that support members 42 space top hose section 16 above the roof of the car as shown in FIG. 1. Thus, the water spraying out from the perforations of top hose section 16 extend over a substantial area. Moreover, the spacing of the top hose member 16 above the roof enables the same to be cleaned without removing the top hose member 16 or the entire assemblage 10 from the car.

Figure 5:
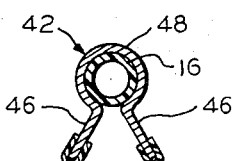
FIG. 5 is a sectional view taken on the plane of line 5—5 in FIG. 2, viewed in the direction indicated, and showing a support member secured on the top hose section.

Support member 42 comprises a bendable resilient clamp having two legs 46 connected together by an intermediate annular collar 48 (see FIG. 5). Legs 46 may have a protective covering 49 of a non-abrasive material fitted over the outer ends thereof to prevent scratching or marring of the car surface.

To attach support members 42 to the top hose section 16, the legs 46 of the resilient clamp are spread apart to enable the collar 48 to encircle and clamp a cross-section of the top hose section 16 (see FIG. 5). The position of support member 42 may be changed by merely spreading legs 46 slightly apart and sliding collar 48 along the length of the corresponding hose section 22 or 24. Although the preferred embodiment shows a clamping arrangement for attaching support member 42 to the top hose section 16, other attaching means may, of course, be used.

Moreover, support members 42 afford means for varying the vertical spacing between the car roof and the top hose section 16. To reduce the vertical spacing, legs 46 are spread further apart and permanently bent in the selected position. To increase the vertical spacing, legs 46 are merely permanently bent in a position where legs 46 are closer together.

Figure 6:
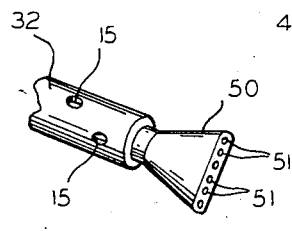
FIG. 6 is a fragmentary perspective view of one of the water spray nozzles attached to the outer end of one of the front hose members.

A water spray nozzle member 50 (see FIG. 6) may be press-fitted into the outer ends of the front hose members 32, 32' and the rear hose members 34, 34'. Nozzle 50 may include a plurality of spaced apart openings 51. The water stream discharging from openings 51 are specifically used for washing the car wheels and the areas adjacent thereto. Of course, nozzles having various water spray patterns may be attached to the outer ends of the front hose members 32, 32' and rear hose members 34, 34', or one or more of these outer ends may be closed off if desired.

Figure 7:
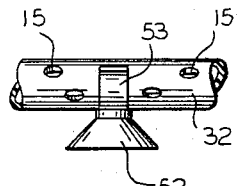
FIG. 7 is a fragmentary perspective view showing a suction cup positioned on one of the front hose members.

To maintain the nozzle 50 in the desired position and to prevent the side hose sections 18, 20 from swaying, suction cups 52 (see FIGS. 2 and 7) may be used to secure the arms 32, 32', 34, 34' to the car. Preferably the attachment of a suction cup 52 to the car is made adjacent nozzles 50. Thus, nozzles 50 may be pointed in the directions shown in FIGS. 1 and 2 or in any other directions, and maintained securely in place by suction cups 52.

A pair of resilient gripping fingers 53 (see FIGS. 2 and 7) resiliently secure the suction cups 52 at the selected point on the corresponding hose member. To vary the positions of the suction cups 52, resilient fingers 53 are spread slightly apart to permit the same to slide along the outer surface of the hose member.

Figure 8:
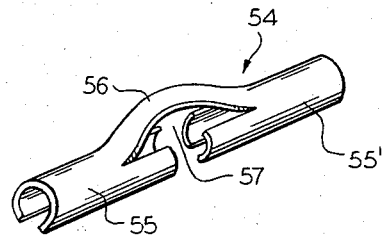
FIG. 8 is a perspective view of one of the channel support means which is positionable on the gutter strip of hard top cars.

To more securely position the water spraying hose assemblage 10 on the car if the same has a hard top, a channel mounting means, as shown in FIGS. 1, 2 and 8 and indicated generally by the reference numeral 54, may be used. Referring specifically to FIG. 8, channel means 54 comprises a pair of channel members 55, 55' spaced apart and integrally formed at adjacent ends by an arcuate segment 56. Arcuate segment 56 defines an archway 57 to accommodate the intermediate hose members 30 or 30' of side hose sections 18, 20. Thus, after each intermediate hose member 30, 30 is positioned through archway 57 of the corresponding channel means 54, channel members 55, 56 are inserted or hung on the projecting gutter strip 57' (see FIG. 1) bordering the longitudinal roof edge of conventional hard-top cars.

As shown in FIG. 3, holding means, such as a pair of clamp members 58, is disposed on the top hose section 16 to retain the various hose members of the side hose sections 18 and 20 securely and compactly in folded or storage relationship. Referring now specifically to FIG. 4, clamp member 58 comprises a pair of spaced apart resilient prongs 58' integrally formed with an arcuate intermediate portion 59. The clamp member 58 may be adhered, spot welded or otherwise joined to the T connector 26 or 28. It should be noted that the various components of the device may be made of plastic, rubber or other suitable materials.

Turning now to FIGS. 1 and 9 through 13, the liquid (detergent or wax) control means 14 will be described. The control means 14 comprises a valve connector indicated generally by the reference numeral 60 and having three terminals: a water input terminal 62, an output terminal 64 and a mixing liquid input terminal 66.

The water input terminal 62 is externally threaded and dimensioned to threadedly receive the female connector of any conventional garden hose 12. The liquid output terminal 64 is internally threaded and screws onto an adapter hose member 67 shown in FIGS. 1 and 2. Hose member 67 links terminal 40′ of terminal connector 40 of side hose section 18 with liquid output terminal 64 to introduce the detergent or wax and/or water into assemblage 10.

The liquid mixing input terminal 66 is internally threaded and dimensioned to receive the externally threaded neck of a container 70 (FIG. 9) for detergent, wax or the like. The substance inside container 70 is mixed with the clear water fed into water input terminal 62.

Figure 11:
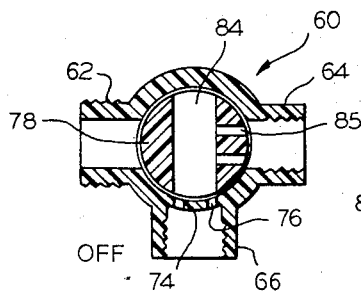
FIG. 11 is a sectional view showing the operation of the valve connector of the liquid control means in FIG. 9, and showing the same in the "off" position with no liquid being discharged into the device.
Figure 12:
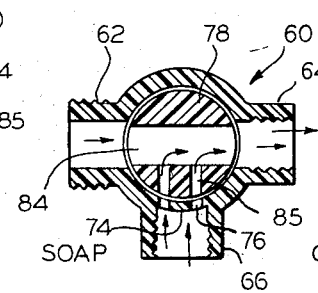
FIG. 12 is a view similar to FIG. 11 but showing the valve connector in the "soap" position whereby another liquid (detergent or wax) is mixed with the clear wash water.
Figure 13:
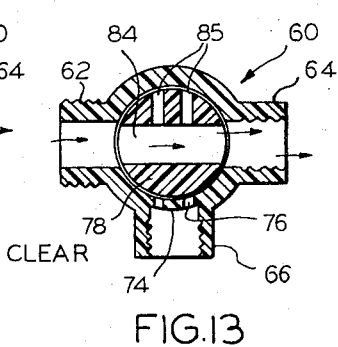
FIG. 13 is a view similar to FIG. 11, but showing the valve connector in the "clear" position whereby only clear water is being discharged into the device.

A partition wall 74 is integrally formed to the inside surface of valve connector 60 above the threaded area of liquid input terminal 66 as shown in FIGS. 11 to 13. A pair of orifices 76 are formed in partition wall 74, the purpose of which is described below.

Figure 10:
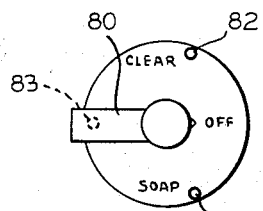
FIG. 10 is an enlarged view of the indicator dial showing the various operative positions of the liquid control means of FIG. 9.
Figure 9:
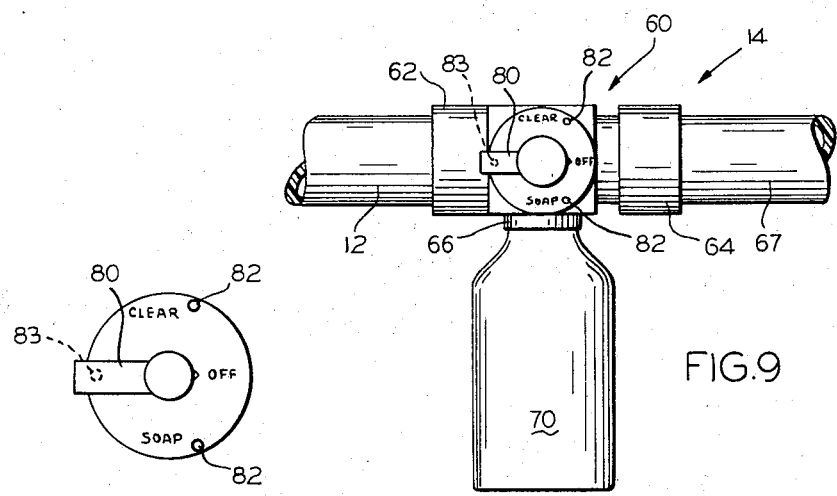
FIG. 9 is a fragmentary elevational view showing the liquid control means and detergent supply means connected between the garden hose and the water spraying hose assemblage.

A revolving cylinder 78 is disposed inside valve connector 60. A shaft not shown is attached to cylinder 78 and extends out from the valve connector 60. A lever arm 80 (FIGS. 9 and 10) is disposed on the shaft to control the rotation of cylinder 78. A pair of oppositely disposed stops or abutments 82 are positioned and extend outward from the top of the connector 60 (FIGS. 9 and 10). A pin 83 is formed to the inner surface at the outer end of bar 80 and extends inward therefrom. Arm 80 is free to rotate until pin 83 contacts either of the abutments 82. Cylinder 78 includes a central passageway 84 and a pair of elongated apertures 85 communicating with passageway 84 and substantially perpendicular thereto. As shown in FIG. 10, cylinder 78 has three extreme positions; an off position, a clear water position and a soap position.

Referring particularly to the illustrations for the various positions of valve connector 60 (FIGS. 10 to 13) the operation of the water control means 14 will now be described. In FIG. 11, valve 60 is in the "off" position and no liquid from the garden hose 12 or from the liquid container 70 is discharged from the liquid output terminal 64.

In FIG. 12, valve 60 is in the "soap" position (FIG. 10) whereby passageway 84 communicates the input terminal 62 with the output terminal 64 and apertures 85 are aligned with orifices 76. Thus, the soap (detergent) from bottle 70 passes through orifices 76 and apertures 85 and finally mixes with the water flowing through passageway 85. The mixed water and detergent then flows out through output terminal 64 into the hose assemblage 10.

In FIG. 13, valve 60 is in "clear" position (FIG. 10) whereby passageway 84 communicates the water input terminal 62 directly with the output terminal 64. In this position, no detergent or liquid from container 70 is mixed with the water.

The procedure for arranging the hose section from the operative position shown in FIG. 2 to the storage and carrying position shown in FIG. 3 will now be described. Since the upper ends of the intermediate portions 30, 30′ are press-fitted to the corresponding connectors 26, 28, the side sections 18, 20 may be readily rotated and then bent over the top hose section 16. Then the outer ends of front hose members 32, 32′ are press-fitted into one of the clamp members 58 and the outer ends of rear hose members 34, 34′ are press-fitted into the other clamp member. If the connectors 26, 28 were threadedly engaged with the intermediate hose members 30, 30′ instead of a press-fit relationship, the threaded connection may be loosened to permit side sections 18, 20 to be similarly moved into position or completely removed and inserted into clamp members 58.

Thus, in operating the device, the top hose section 16 is positioned on the roof of the car. The support members are adjusted, if necessary, to afford adequate support and the desired spacing of the top hose section 16 above the car roof. The channel means 54 may be used and thus inserted into the gutter strip 57′ of the car, if the same is a conventional hard top. The suction cups 52 may be secured to the sides of the car. The garden hose 12 is attached to the input terminal of valve connector 60. Valve 41′ is initially placed in its "on" position. Then valve 60 is turned to the "clear" position to spray water on the entire car surface thereby loosening the dirt thereon and washing the loose dust therefrom. Valve connector 60 is then turned to the "soap" position, whereby soap or detergent in container 70 is mixed with the water and sprayed over the entire car. Now, the roof of the car and the side of the car adjacent side section 20 may be scrubbed. Then valve 41′ may be turned to its "off" position and the opposite side of the car scrubbed thereby conserving both water and soap. Then, if desired, the container 70 with soap therein may be removed and replaced with another having wax. Now, the water hose assemblage 10 sprays wax mixed with water on the entire car. Finally the surface of the car may be wiped dry after first removing the entire assemblage from the car.

From the drawings and the foregoing description, it should be apparent a novel portable vehicle washing device has been provided which affords a simplified means for washing automobiles without requiring the installation of complex mounting structures. Moreover, the device of this invention may be easily folded into a compact package, which may be conveniently stored and readily transported.

Furthermore, the support means 42 supports the water spraying hose assemblage 10 on the roof of the car and also positions the top hose section in spaced relationship with the car roof. The various hose members are readily detachable to afford ready means for conveniently replacing sections when repair is needed or for substituting sections of different lengths to accommodate larger or smaller automobiles.

Although the various hose members are shown press-fitted to connectors, other connecting means may of course be used. Furthermore, although top section 16 is shown comprising semi-circularly shaped hose members 22, 24, it is within the contemplation of the invention to provide a single substantially semi-circularly shaped hose part connected to a pair of rotatable couplers to enable the hose part to be rotated from one area of the car roof to another. Thus, a single hose part could be used in place of the two hose members of hose section 16.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A portable washing device for vehicles including a top perforated hose section and a side perforated hose section, wherein the improvement comprises:
 support means associated with the top hose section and removably associated with the top of the vehicle to support said device thereon and space said top hose section above the vehicle roof, and a channel means associated with the side hose section and positionable over a gutter strip on said vehicle, the cooperation of the channel means and the gutter strip affording support for said device.

2. The portable washing device of claim 1, wherein: said support means is adjustably positionable on said top hose section to optimize the support of said device.

3. The portable washing device of claim 2, wherein said support means comprises a clamp having a pair of spaced apart legs connected by an intermediate collar therebetween, said support means being resiliently secured in position on said top hose section, said legs being bendable apart from each other to permit movement of said support means on said top hose section.

4. The portable washing device of claim 1, wherein holding means are secured to said top hose section, said side hose section being positionable in said holding means when said device is in a storage position.

5. The portable washing device of claim 1, wherein said side hose section is substantially T shaped, said side hose section comprises an intermediate hose member, a front hose member and a rear hose member, said front and rear hose members extending outward in opposite directions from the lower end of the intermediate hose member, the upper end of said intermediate hose member being associated with the top hose section.

6. The portable washing device of claim 5, wherein: said top hose section comprises at least one substantially semi-circular hose member, a pair of top connectors connecting said hose members together to afford a continuous water flow passage; and a pair of holding means secured to said connectors, the outer end of the front hose member of said side hose section being positionable in one of said holding means and the outer end of the rear hose member being positionable in the other of said holding means.

7. The portable washing device of claim 6, wherein said holding means comprises a clamp member having a pair of spaced apart resilient arms integrally formed with an arcuate intermediate portion, the outer surface of said intermediate portion being rigidly secured to said connector.

8. The portable washing device of claim 5, wherein: a liquid control means is associated with the lower end of one of the side hose sections;

a garden hose connected to said liquid control means; and a container connected thereto, said liquid control means adapted to control the mixing of the liquid stored in said container with said water, said liquid control means having a first position to prevent any flow of liquid through said device, a second position to discharge only water from the garden hose in said device and a third position whereby the liquid from the container mixes with the water from the hose and said mixture is discharged into said device.

9. The portable washing device of claim 8, wherein: nozzles are disposed at the outer ends of the front and rear hose members of said side hose section to spray the front and rear areas respectively of a side of the vehicle;

securing means are adjustably positioned on the front and rear hose members to secure same to the vehicle, said securing means having the capability to maintain said nozzles in various predetermined positions; and the perforations formed in said hose members are angularly spaced apart and of various sizes and shapes to vary the direction and intensity of the liquid streams flowing out therefrom.

10. The portable washing device of claim 5, wherein: one of said side hose sections is operatively disposed on each side of said vehicle;

said top hose section comprises two substantially semi-circular shaped top hose members;

a pair of upper connectors removably coupling said top members together, the upper end of each intermediate hose member of said side sections being coupled to one of said upper connectors;

a pair of lower connectors, each of the lower connectors coupling together the inner ends of the front and rear hose members and the lower end of the intermediate hose member of one of said side hose sections; and liquid input means being coupled into one of said lower connectors to introduce liquid into said device.

11. The portable washing device of claim 10, wherein: holding means are secured to the upper connectors; and at least the upper end of the intermediate hose members of the side hose sections are rotatably associated with the upper connectors, the rotation of the intermediate hose members causing rotation of the corresponding side hose section and thereby permitting the outer ends of the front and rear hose members to be conveniently inserted into said holding means.

12. The portable washing device of claim 1, wherein said channel means comprises a pair of channel members integrally connected at adjacent ends by an arcuate segment, said arcuate segment defining an archway between said channel members, said intermediate hose member being positionable within and through said archway and said channel members being positionable over said gutter strip.

References Cited

UNITED STATES PATENTS

| | | |
|---|---|---|
| 1,489 | 10/1840 | Lowell. |
| 3,139,096 | 6/1964 | Harris _____ 134—100 |

FOREIGN PATENTS

| | | |
|---|---|---|
| 573,706 | 4/1959 | Canada. |
| 1,346,639 | 11/1963 | France. |
| 249,642 | 4/1926 | Great Britain. |

ROBERT L. BLEUTGE, *Primary Examiner.*